Patented Dec. 26, 1939

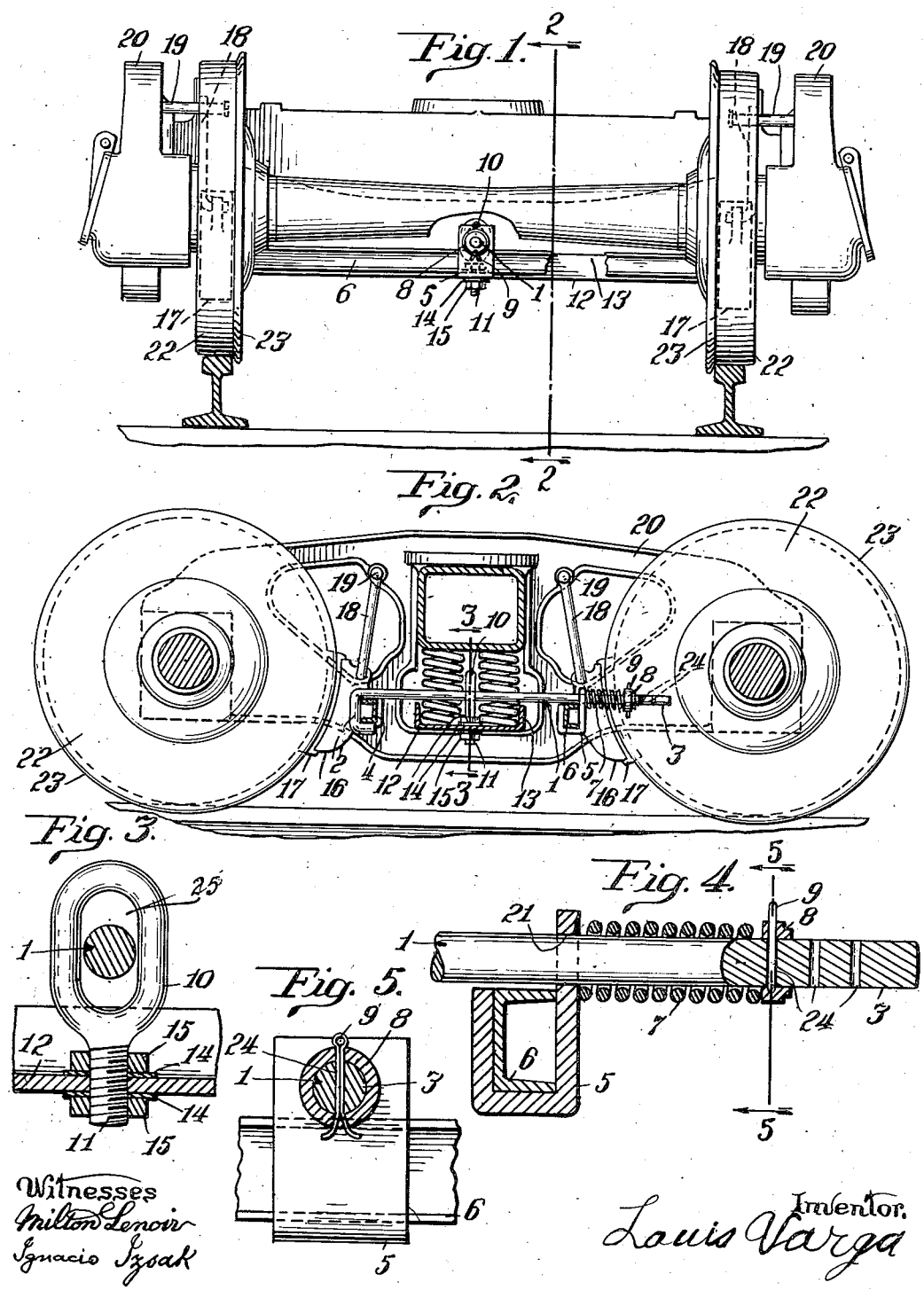

2,184,690

UNITED STATES PATENT OFFICE 2,184,690

BRAKE BEAM EQUALIZER SAFETY SUPPORT

Louis Varga, Chicago, Ill., assignor to Midwest Car Company, Chicago, Ill.

Application February 28, 1939, Serial No. 258,998

1 Claim. (Cl. 188—210)

This invention relates to brake beam equalizer safety supports such as are commonly used on the brake beams of railroad trucks.

The main object of this invention is to provide a brake beam equalizing safety support to hold the brake shoes at a suitable distance from the tread of the wheel when the car is in motion, to prevent wear on the same.

Another object of this invention is to provide a brake beam equalizer safety support to prevent, when the car is in motion, the unnecessary vibration and wear of the brake beams, brake hangers and supporting pins, thereby insuring a longer usefulness of same.

A further object of this invention is to provide a brake beam equalizer safety support, to prevent unexpected accidents by the dropping of the brake beams to the ground, in case the brake hangers or their supporting pins should become loosened or break.

A still further object of this invention is to provide a device of the character described, which will be simple in construction, which may be produced along lines convenient for low cost manufacture, and which will, at the same time, be highly efficient for carrying out the purposes for which it is intended.

With the foregoing and other objects in view, which will appear as the description proceeds, the invention consists in certain novel features of construction and arrangements of parts hereinafter more fully described, illustrated in the accompanying drawing, and particularly pointed out in the appended claim, it being understood that various changes in the form, proportion, size and minor details of the structure may be made without departing from the spirit or sacrificing any of the advantages of the invention.

For the purpose of facilitating an understanding of the invention, I have illustrated in the accompanying drawing a preferred embodiment thereof, from an inspection of which, when considered in connection with the following description, the invention, its mode of construction and assembly, and many of its advantages will be readily understood and appreciated.

Referring to the drawing, in which similar characters of reference are employed to indicate corresponding parts throughout the several figures of the drawing—

Fig. 1 is an end elevation of the truck.

Fig. 2 is a cross-sectional view of the truck, on line 2—2 of Fig. 1, showing the arrangement of the brake beam equalizing safety support.

Fig. 3 is a cross-sectional view on line 3—3 of Fig. 2, showing the eye bolt of the equalizing rod.

Fig. 4 is an enlarged longitudinal sectional view of the spring end of the brake beam equalizing safety support.

Fig. 5 is a cross-sectional view, on line 5—5 of Fig. 4.

Referring to the drawing more specifically by characters of reference, the numeral 1 designates the supporting rod of the brake beam safety support, one end 2 of which is shaped to fit around the inner brake beam 4; the other end 3 is a straight end, which supports the bracket 5, shaped to fit around the outer brake beam 6.

The straight end 3 supports the coiled spring 7, of suitable diameter and length, which is retained in its position by the safety collar or abutment member 8, and the split cotter pin 9.

The straight end 3 has a series of holes 24 adjacent to its outer extremity, placed at suitable distances to permit the shortening of the length of the coiled spring 7, to permit the storing of energy in the coils.

The supporting rod 1 projects thru the center hole 25, of the eye bolt 10, the stem 11, of which is made fast to the web 12, of the spring plank 13, by means of the washers 14, and nuts 15.

The ends of the brake beams 4 and 5 are embedded in the heads 16, of the brake shoes 17.

The heads 16 are supported by the brake hangers 18, which are pivotally mounted on the pins 19, which are made fast to the truck frame 20.

In mounting the brake beam equalizing safety support, the eye bolt 10 is made fast at a suitable place to the web 12, of the spring plank 13, by means of the washers 14, and the nuts 15.

The supporting rod 1 is pushed through the center hole 25, of the eye bolt 10, and through the center hole 21, of the bracket 5, which is shaped to fit around the outer brake beam 6, until the end 2 snugly fits around the brake beam 4. The coiled spring 7 is slipped over the end 3, of the supporting rod 1, and the safety collar 8 is made fast to the supporting rod 1 by means of the split cotter pin 9.

Operation of the brake beam equalizing safety support

Assuming that the brake shoes 17 are kept at a suitable distance from the tread of the wheels by the coiled spring 7, when the compressed air is applied to the brakes, the brake shoes 17 are forced to the treads 22, of the wheels 23, and the coiled springs 7 are compressed. When the brakes are released, this compression comes to action by elongating the coiled spring 7 to its former length, thereby returning the brake shoes 17 to their former suitable positions.

What I claim as new and desire to protect by Letters Patent is:

In a railway car truck, a spring plank associated therewith, a pair of inner brake beams, brake shoes on said beams, truck wheels having treads adapted to be engaged by said brake shoes, a safety support device comprising a rod one end of which is shaped to engage about one of said brake beams, a bracket member slidably carried by said rod intermediate its length and shaped to engage said other brake beam, said rod having a series of holes adjacent its other end, adjustable abutment means engaging with one of said holes, spring means interposed between said abutment means and said bracket whereby said brake shoes are adapted to be retracted from the wheel treads, an eye-bolt secured to the spring plank, said eye-bolt slidably engaging said safety support member to aid in maintaining said safety support device in position on the truck.

LOUIS VARGA.